United States Patent
Ahmed et al.

(10) Patent No.: US 10,527,715 B2
(45) Date of Patent: Jan. 7, 2020

(54) RADAR TARGET STIMULATION DEVICE AND METHOD

(71) Applicant: Rohde & Schwarz GmbH & Co. KG, Munich (DE)

(72) Inventors: Sherif Ahmed, Munich (DE); Steffen Heuel, Munich (DE); Andreas Reil, Tutzing (DE); Udo Reil, Herrsching (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 268 days.

(21) Appl. No.: 15/235,358

(22) Filed: Aug. 12, 2016

(65) Prior Publication Data
US 2017/0363719 A1    Dec. 21, 2017

Related U.S. Application Data

(60) Provisional application No. 62/352,180, filed on Jun. 20, 2016.

(51) Int. Cl.
*G01S 7/40*    (2006.01)

(52) U.S. Cl.
CPC ..... *G01S 7/4052* (2013.01); *G01S 2007/4095* (2013.01)

(58) Field of Classification Search
CPC .................. G01S 7/4052; G01S 13/931; G01S 2007/4086; G01S 2007/4095
USPC ........................................................ 342/169
See application file for complete search history.

(56) References Cited

U.S. PATENT DOCUMENTS

| 4,005,424 A * | 1/1977 | Fetter .................... G01S 7/4052 342/171 |
| 4,527,249 A * | 7/1985 | Van Brunt .......... G06F 17/5022 703/15 |
| 4,660,041 A | 4/1987 | Maples et al. |

(Continued)

FOREIGN PATENT DOCUMENTS

| DE | 102014217524 | * 3/2016 |
| JP | 2009236628 A | 10/2009 |

(Continued)

OTHER PUBLICATIONS

Machine Translation of KR101357596 (Year: 2014).*

*Primary Examiner* — Frank J McGue
(74) *Attorney, Agent, or Firm* — Potomac Technology Law, LLC (57) ABSTRACT

A radar simulation device for testing a device under test with respect to at least one radar scenario is provided. The radar simulation device comprises a memory, a radar scenario simulator, and two or more antennas. The memory is configured to store the radar scenario with respect to the device under test, and to provide the radar scenario to the radar scenario simulator. The radar scenario simulator is configured to receive a first number of radar signals from the device under test via the at least two antennas, to simulate the at radar scenario by manipulating the first number of radar signals according to the radar scenario and generating a resulting second number of manipulated radar signals, and to transmit the second number of manipulated radar signals to the device under test via the at least two antennas.

21 Claims, 4 Drawing Sheets

(56) References Cited

U.S. PATENT DOCUMENTS 9,933,515 B2 * 4/2018 Prokhorov ............ G01S 7/4972
2014/0300509 A1 * 10/2014 Choi ..................... G01S 7/4056
342/200

FOREIGN PATENT DOCUMENTS

KR         101357596     *   2/2014
WO        WO99/27383   *   6/1999

* cited by examiner

RADAR TARGET STIMULATION DEVICE AND METHOD

RELATED APPLICATIONS

This application claims the benefit of the earlier filing date under 35 U.S.C. § 119(e) of U.S. Provisional Application Ser. No. 62/352,180 (filed 2016 Jun. 20).

FIELD

The invention relates to a testing device, such as a radar target simulation device, for testing a device under test, and a radar target simulation method.

BACKGROUND

Generally, in times of an increasing number of advanced driver assistance systems (ADAS) employing radar sensors, there is a growing need of a testing device and a testing method for testing such radar sensors.

U.S. Pat. No. 4,660,041 discloses a device including an array of antenna systems which send scene simulation signals to a target seeking radar. Based on a lack of storage capability, however, the device lacks flexibility and provides testing results that lack practical relevance or applicability as a result of its ability to simulate only a single—permanently wired—scene. Additionally, the lack of flexibility is emphasized by the fact that an intermediate frequency signal has to be fed-back.

Nevertheless, investigating devices under test such as radar sensors, for example, with respect to a plurality of different radar scenarios, in a most efficient and flexible manner is very important, because only in this way practice-oriented results can be obtained in order to ensure the proper functioning of the sensors in the field.

What is needed, therefore, is an approach for testing devices under test (e.g., radar sensors) in a most efficient and flexible manner, leading to highly practice-oriented testing results.

SOME EXAMPLE EMBODIMENTS

Embodiments of the present invention advantageously address the foregoing requirements and needs, as well as others, by providing a testing device and testing method for testing devices under test (e.g., radar sensors) in a most efficient and flexible manner, leading to highly practice-oriented testing results.

In accordance with example embodiments, a radar target simulation device for testing a device under test with respect to at least one radar scenario is provided. The radar target simulation device comprises a storage unit, a radar scenario simulation unit, and at least two antennas. The storage unit is configured to store the at least one radar scenario with respect to the corresponding device under test and to provide the at least one radar scenario for the radar scenario simulation unit. Further, the radar scenario simulation unit is configured to simulate the at least one radar scenario by receiving a first number of radar signals from the device under test with the aid of the at least two antennas, by manipulating the first number of radar signals according to the at least one radar scenario, which results in a second number of manipulated radar signals, and by transmitting the second number of manipulated radar signals to the device under test with the aid of the at least two antennas.

According to one embodiment of the radar target simulation device, the at least one radar scenario comprises at least two radar targets.

According to a further embodiment of the radar target simulation device, the at least two antennas form a two-dimensional antenna array or a three-dimensional antenna array.

According to a further embodiment of the radar target simulation device, the first number of radar signals comprises a chirp signal or a frequency hopping signal or a Doppler signal or any other kind of signal or a combination thereof.

According to a further embodiment of the radar target simulation device, the second number of manipulated radar signals comprises a chirp signal or a frequency hopping signal or a Doppler signal or any other kind of signal or a combination thereof.

According to a further embodiment of the radar target simulation device, manipulating the first number of radar signals is based on adjustment of signal frequency or signal delay or signal amplitude or a combination thereof.

According to a further embodiment of the radar target simulation device, manipulating the first number of radar signals with respect to angle is achieved by selecting a respective number of the at least two antennas, the respective number having a desired angular position, for transmitting the second number of manipulated radar signals.

According to a further embodiment of the radar target simulation device, an optical representation of the at least one radar scenario, the optical representation comprising radar reference points, is provided.

In accordance with further example embodiments, a radar target simulation method for testing a device under test with respect to at least one radar scenario is provided. The radar target simulation method comprises storing the at least one radar scenario with respect to the corresponding device under test and providing the at least one radar scenario, and simulating the at least one provided radar scenario by receiving a first number of radar signals from the device under test, by manipulating the first number of radar signals according to the at least one radar scenario, which results in a second number of manipulated radar signals, and by transmitting the second number of manipulated radar signals to the device under test.

According to one embodiment of the radar target simulation method, the at least one radar scenario comprises at least two radar targets.

According to a further embodiment of the radar target simulation method, the first number of radar signals is received with the aid of at least two antennas, and also the second number of manipulated radar signals is transmitted with the aid of said at least two antennas. Advantageously, said at least two antennas form a two-dimensional antenna array or a three-dimensional antenna array.

According to a further embodiment of the radar target simulation method, the first number of radar signals comprises a chirp signal or a frequency hopping signal or a Doppler signal or any other kind of signal or a combination thereof.

According to a further embodiment of the radar target simulation method, the second number of manipulated radar signals comprises a chirp signal or a frequency hopping signal or a Doppler signal or any other kind of signal or a combination thereof.

According to a further embodiment of the radar target simulation method, manipulating the first number of radar signals is based on adjustment of signal frequency or signal delay or signal amplitude or a combination thereof.

According to a further embodiment of the radar target simulation method, manipulating the first number of radar signals with respect to angle is achieved by selecting a respective number of the at least two antennas, the respective number having a desired angular position, for transmitting the second number of manipulated radar signals.

According to a further embodiment of the radar target simulation method, an optical representation of the at least one radar scenario, the optical representation comprising radar reference points, is provided.

In accordance with further example embodiments, a system is provided. The system comprises a device under test, and a radar target simulation device for testing the device under test with respect to at least one radar scenario, wherein the radar target simulation device comprises a storage unit, a radar scenario simulation unit, and at least two antennas. Further, the storage unit is configured to store the at least one radar scenario with respect to the corresponding device under test and to provide the at least one radar scenario for the radar scenario simulation unit. Further, the radar scenario simulation unit is configured to simulate the at least one radar scenario by receiving a first number of radar signals from the device under test with the aid of the at least two antennas, by manipulating the first number of radar signals according to the at least one radar scenario, which results in a second number of manipulated radar signals, and by transmitting the second number of manipulated radar signals to the device under test with the aid of the at least two antennas.

In accordance with further example embodiments, a training system is provided for training an autonomous vehicle with the aid of at least one traffic scenario. The system comprises a memory, a radar simulator, at least two antennas, an optical simulator, and a display. The memory is configured to store the at least one traffic scenario and to provide the at least one traffic scenario to the radar simulator and to the optical simulator. The radar simulator is configured to receive (via the at least two antennas) a first number of radar signals from at least one radar sensor of the autonomous vehicle, to simulate the at least one traffic scenario by manipulating the first number of radar signals according to the at least one traffic scenario to generate a second number of manipulated radar signals, and to transmit (via the at least two antennas) the second number of manipulated radar signals to the at least one radar sensor of the autonomous vehicle. The radar simulator thereby provides a radar representation of the at least one traffic scenario. The radar simulator is further configured to provide the second number of manipulated radar signals to the optical simulator. The optical simulator is configured to generate an optical representation of the at least one traffic scenario based on the second number of manipulated radar signals, and to provide the optical representation of the at least one traffic scenario for display of the optical representation of the at least one traffic scenario on the display.

According to a further embodiment of the training system, the system further comprises a feedback circuit. The feedback circuit is configured to receive vehicle information from at least one electronic controller of the autonomous vehicle, and to provide the information to the radar simulator and to the optical simulator. The vehicle information received from the at least one electronic controller of the autonomous vehicle includes data reflecting one or more of acceleration, deceleration and steering of the autonomous vehicle. The radar simulator is further configured to adapt the radar representation of the at least one traffic scenario based on the vehicle information, and the optical simulator is further configured to adapt the optical representation of the at least one traffic scenario based on the vehicle information.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which.

DETAILED DESCRIPTION

A testing device and testing method, for testing devices under test (e.g., radar sensors) in a most efficient and flexible manner, leading to highly practice-oriented testing results, is described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 1:
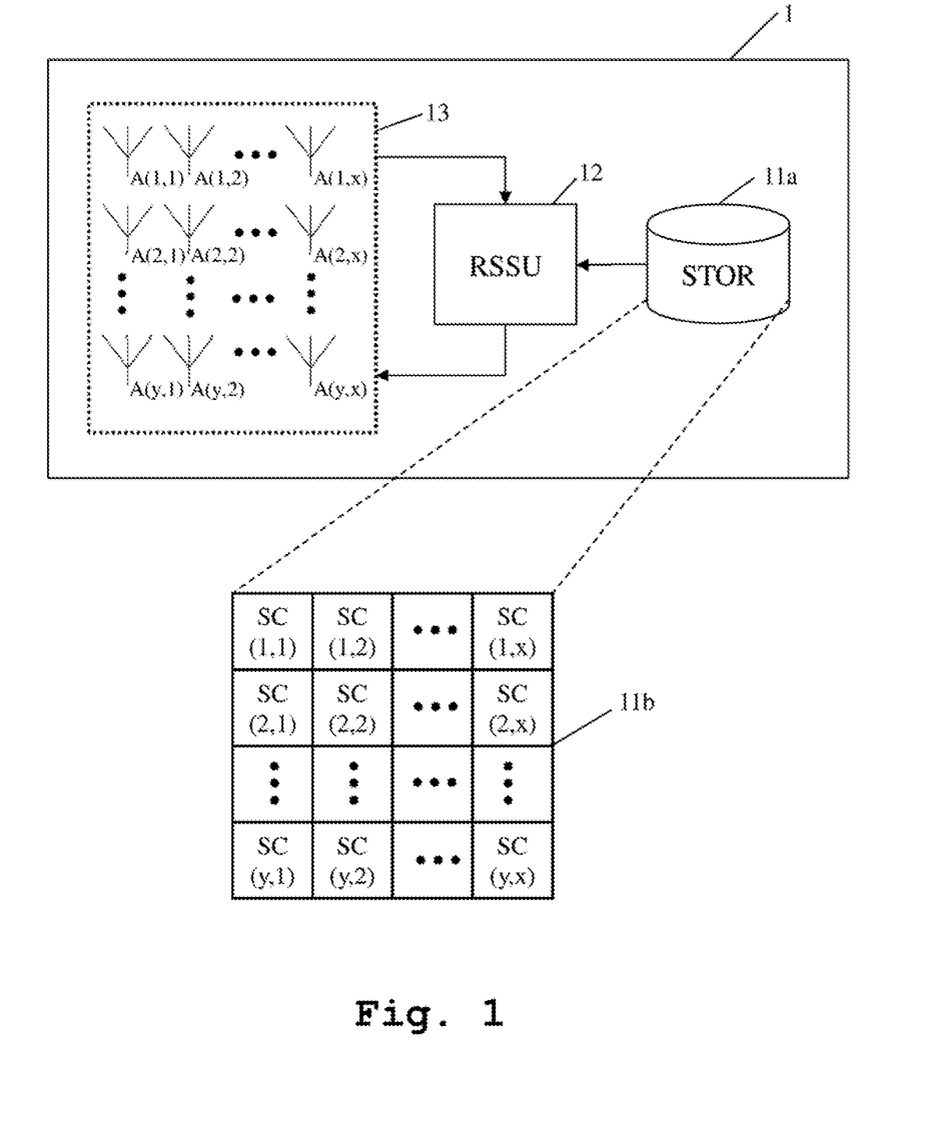
FIG. 1 shows a radar target simulation device, in accordance with example embodiments of the present invention.

FIG. 1 shows a radar target simulation device 1, for testing a device under test, such as a radar sensor, with respect to at least one radar scenario, in accordance with example embodiments of the present invention. For instance, the radar sensor device under test may be part of an advanced driver assistance system integrated into a car. The radar target simulation device 1 comprises a storage unit 11a, a radar scenario simulation unit 12, and y*x antennas A(y,x) forming an y×x antenna array 13.

Further, the storage unit 11a stores the at least one radar scenario with respect to the corresponding device under test. For this purpose, the storage unit 11a contains storage contents 11b comprising y*x storage cells SC(y,x), where each storage cell SC(y,x) corresponds to the respective antenna A(y,x) and comprises several parameters, each with respect to adjustment of different radar properties, such as frequency, delay, amplitude, angle, or a combination thereof, and in consideration of various devices under test and radar scenarios.

After the storage unit 11a has provided the respective information in form of the storage contents 11b for the radar scenario simulation unit 12, the radar scenario simulation unit 12 simulates the at least one radar scenario, each of which may advantageously comprise at least two radar targets, such as pedestrians, cars, busses or the like.

For this purpose, the radar scenario simulation unit 12 receives a first number of radar signals from the device under test with the aid of the antenna array 13. Then, the radar scenario simulation unit 12 manipulates the first number of radar signals according to the at least one radar scenario in consideration of the above-mentioned adjustment of signal frequency, signal delay, signal amplitude, angle, or a combination thereof, which results in a second number of manipulated radar signals. Afterwards, the radar scenario simulation unit 12 transmits the second number of manipulated radar signals to the device under test with the aid of the antenna array 13.

By way of example, the adjustment of signal frequency, respectively Doppler frequency, signal delay, and signal amplitude, respectively attenuation, may be employed to simulate a desired velocity, distance, and radar cross section (RCS) of a realistic radar target, and different angles are simulated by selection of the respective antennas of the antenna array 13, for transmitting the second number of manipulated radar signals to the device under test.

In this context, multiple antennas of the antenna array 13 are advantageously arranged at different angles with respect to the main radiation direction of the device under test.

Further, while at least two antennas are used for transmitting the second number of manipulated radar signals to the device under test, one antenna would be sufficient for receiving the first number of radar signals from the device under test. Additionally, the usage of at least two antennas advantageously allows for beamforming.

Additionally, multiple antennas outside the antenna array 13 not shown in the figures) may be arranged at the same angle with respect to the main radiation direction of the device under test but with different distances thereto, which may advantageously lead to a three-dimensional antenna array.

Figure 2:
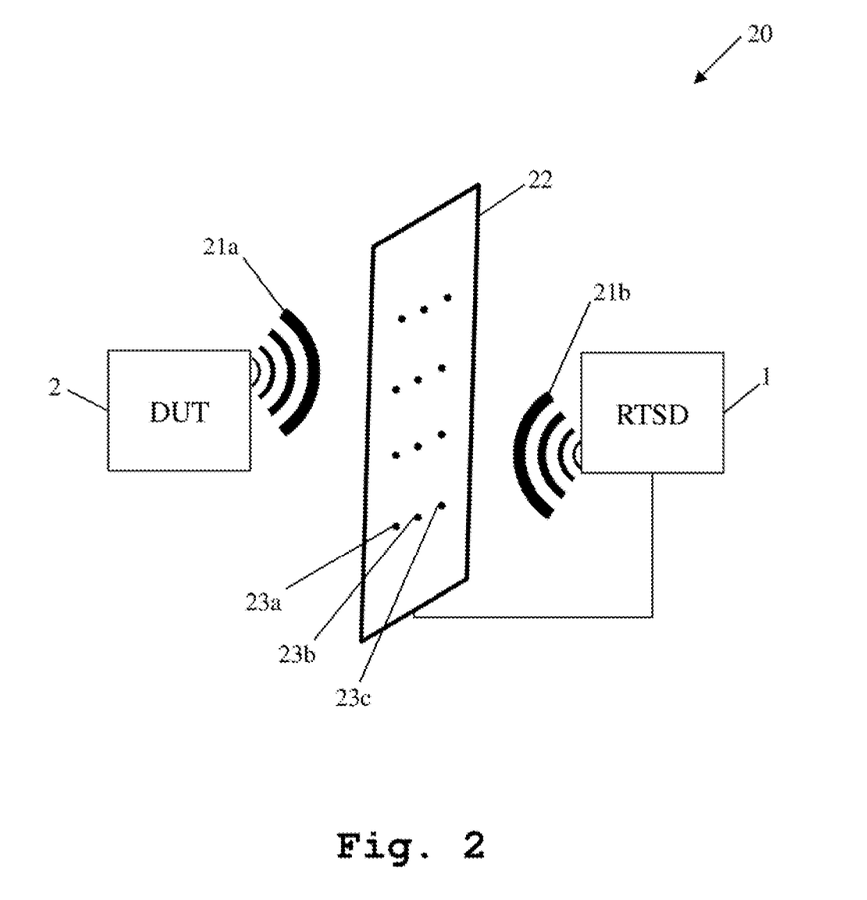
FIG. 2 shows a system comprising a device under test and a radar target simulation device, in accordance with example embodiments of the present invention.

FIG. 2 shows a system 20 comprising a device under test and a radar target simulation device, in accordance with example embodiments of the present invention. The radar target simulation device 1 advantageously provides an optical representation of the at least one radar scenario to be simulated on a screen 22. Further advantageously, the optical representation provided on the screen 22 comprises radar reference points 23a, 23b, 23c.

Further, the system 20 comprises—in addition to the radar target simulation device 1 and the screen 22—a device under test 2. By way of example, due to the fact that the screen 22 is located between the device under test 2 and the radar target simulation device 1, the screen 22 is transparent with respect to the radar signals 21a, 21b.

After radar signals 21a have been sent by the device under test 2 to the radar target simulation device 1, the radar target simulation device 1 simulates the at least one radar scenario, provides an optical representation thereof on the screen 22, and sends back the corresponding manipulated radar signals 21b to the device under test 2.

Advantageously, with respect to the radar signals 21a sent by the device under test 2 and the corresponding manipulated radar signals 21b sent back to the device under test 2, there is no need for either any kind of synchronization, or feedback of any kind of intermediate frequency signal.

Further, the at least one radar scenario may advantageously change over time, and the at least one radar scenario may be changed in real time and/or unlimited in time.

In this manner, and with the aid of the radar reference points 23a, 23b, 23c, correct fusion of sensor data from radar and optical systems can be tested in a most efficient and accurate manner, which is advantageous in view of the increasing number of systems combining radar and optical techniques. Additionally, detection algorithms for real life scenarios can likewise efficiently and accurately be trained in order to ensure a proper detection and identification of radar targets in the field.

Figure 3:
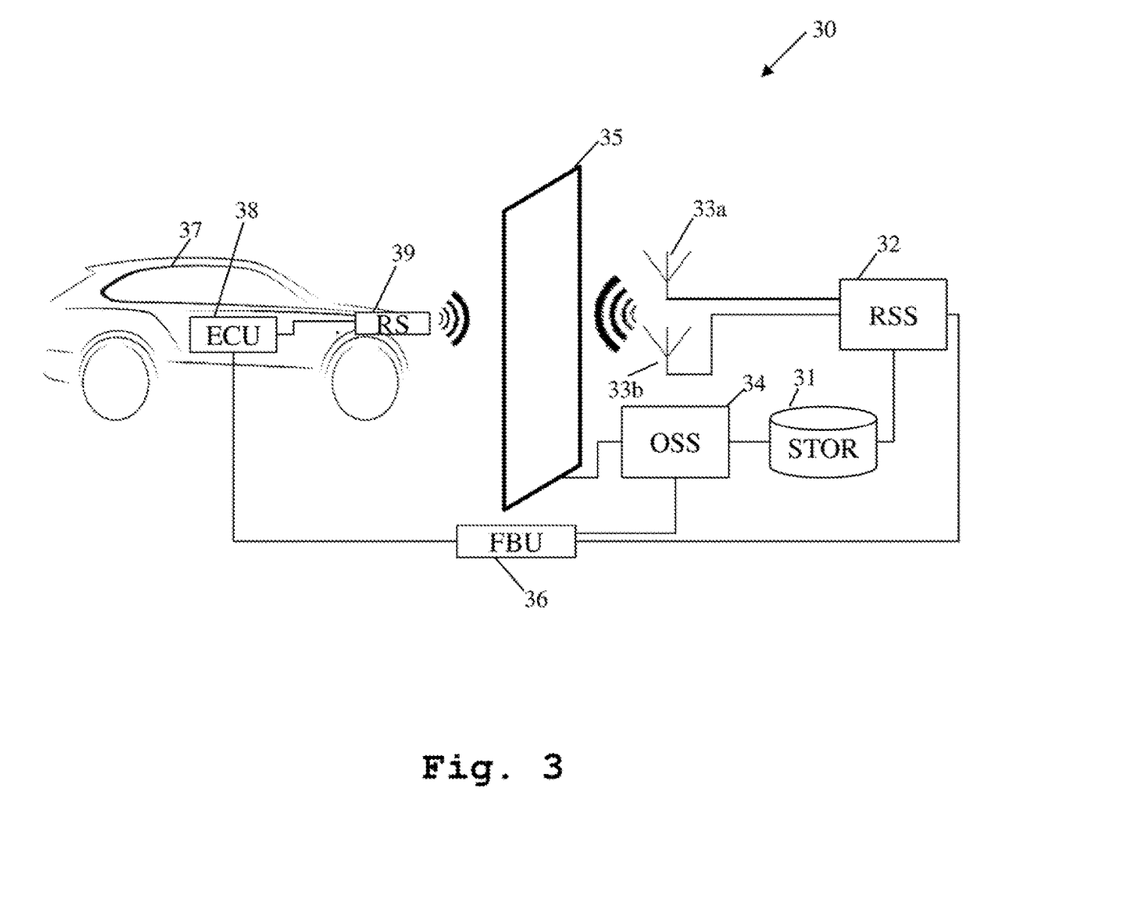
FIG. 3 shows a training system for training an autonomous vehicle, in accordance with example embodiments of the present invention.

FIG. 3 shows a training system 30 for training an autonomous vehicle 37, with the aid of at least one traffic scenario, in accordance with example embodiments. The training system 30 comprises a memory 31, a radar scenario simulator 32, two antennas 33a and 33b, an optical scenario simulator 34, a display 35, and a feedback unit 36.

The memory 31 stores the at least one traffic scenario, and provides the at least one traffic scenario to the radar scenario simulator 32 and to the optical scenario simulator 34. Further, the provision of the at least one traffic scenario to the radar scenario simulator 32 and to the optical scenario simulator 34 may be simultaneous.

Advantageously, each of the at least one traffic scenario may change over time, may be changed in real time, may be unlimited in time, or any combination thereof.

Further, the radar scenario simulator 32 receives (via one or more of the antennas 33a and 33b) one or more radar signals from the radar sensor 39 of the autonomous vehicle 37. The radar scenario simulator 32 then simulates the at least one traffic scenario by manipulating the received radar signals based on the at least one traffic scenario, and transmits (via one or more of the antennas 33a and 33b) the manipulated radar signals back to the radar sensor 39 of the autonomous vehicle. The radar scenario simulator 32 provides a radar representation of the at least one traffic scenario to the autonomous vehicle. By way of example, the radar scenario simulator 32 utilizes both of the antennas 33a and 33b for the transmission of the manipulated radar signals back to the radar sensor 39 of the autonomous vehicle. In this manner, effects such as Doppler can advantageously be simulated. Additionally, the radar scenario simulator provides manipulated radar signals to the optical scenario simulator.

The optical simulator generates an optical representation of the at least one traffic scenario based on the manipulated radar signals, and provides the optical representation of the at least one traffic scenario to the display for display of the optical representation of the at least one traffic scenario. With the aid of the optical representation provided on the display 35, for instance, optical tracking systems of the vehicle 37 for driving autonomously may be tested.

In this context, according to further embodiments, the training system 30 may additionally comprise one or more controllers for manipulating other systems of the autonomous vehicle 37, such as laser, ultrasonic, and infrared sensors or the like. For instance, such sensors may be manipulated with the aid of moveable reflection plates, which are dynamically positioned in accordance with the at least one traffic scenario.

According to a further example embodiment, the feedback unit 36 of the training system 30 is connected to the electronic control unit (ECU) 38 of the autonomous vehicle 37. The ECU 38 gathers data from the sensors, such as the radar sensor 39 of the autonomous vehicle 37, and calculates control information with respect to, for example, acceleration, deceleration, and steering (or any combination thereof) of the autonomous vehicle. The feedback unit 36 receives the control information, and provides the control information to the radar scenario simulator 32 and to the optical scenario simulator 34. By way of example, the provision of the control information to the radar scenario simulator 32 and to the optical scenario simulator 34 may be simultaneous. By way of further example, with the aid of the feedback control information, the radar scenario simulator 32 and the optical scenario simulator 34 can respectively adapt the radar representation and the optical representation of the at least one traffic scenario based on the received control information.

Further, with respect to the radar representation provided by the radar scenario simulator 32, weather conditions (e.g., rain, snow, wind, or the like) may advantageously be simulated. For instance, rain and snow may be reflected by noise superposing the manipulated radar signals sent back to the autonomous vehicle 37, and wind may be reflected by a fading of the manipulated radar signals. Additionally, for training the autonomous vehicle 37 (e.g., a self-driving algorithm thereof), for example, with respect to safety aspects, interferers (e.g., radar sensors of other vehicles, radar of traffic management systems, or the like can also be simulated to account for any affects thereof.

Accordingly, the training systems according to example embodiments, advantageously allow for realistic training of autonomous vehicles (e.g., self-driving algorithms thereof) in a laboratory or factory setting. With the aid of such embodiments of the provided training system, therefore, expensive and dangerous tests in the field can advantageously be avoided.

Figure 4:
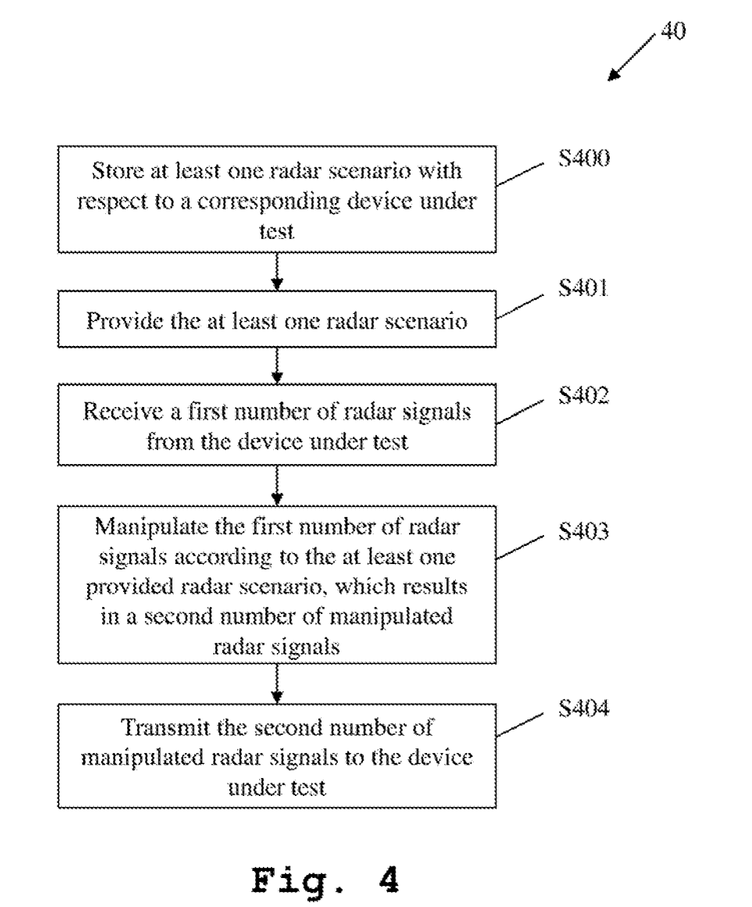
FIG. 4 shows a flow chart illustrating a radar target simulation method, in accordance with example embodiments of the present invention.

FIG. 4 shows a flow chart illustrating a radar target simulation method 40, in accordance with example embodiments of the present invention. In a first step S400, at least one radar scenario with respect to a corresponding device under test is stored. In a second step S401, the at least one radar scenario is provided for simulation which will be achieved with the aid of the following steps S402 to S404. In the step S402, a first number of radar signals is received from the device under test. Then, in the fourth step S403, the first number of radar signals is manipulated according to the at least one radar scenario having been provided in step S401, which results in a second number of manipulated radar signals. In step S404, the second number of manipulated radar signals is transmitted to the device under test.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A radar simulation apparatus, for testing a device under test with respect to at least one radar scenario, the radar simulation apparatus comprising:
    a memory;
    a radar simulator; and
    at least two antennas; and
    wherein the memory is configured to store the at least one radar scenario with respect to the device under test, and to provide the at least one radar scenario to the radar simulator,
    wherein the at least one radar scenario is capable of being simulated in a continuous manner until intentionally terminated,
    wherein the radar simulator is configured to receive, via one or more of the at least two antennas, a first number of radar signals from the device under test, to simulate the at least one radar scenario by manipulating the first number of radar signals based on the at least one radar scenario and generating a resulting second number of manipulated radar signals, and to transmit, via the at least two antennas, the second number of manipulated radar signals to the device under test,
    wherein the at least two antennas form an antenna array that is one of a two-dimensional antenna array and a three-dimensional antenna array, and multiple first antennas of the antenna array are arranged at different angles with respect to a main radiation direction of the device under test, and
    wherein multiple second antennas outside the antenna array are arranged at the same angles as the multiple first antennas with respect to the main radiation direction of the device under test, and at different distances to the device under test than distances of the multiple first antennas to the device under test.

2. The radar simulation apparatus according to claim 1, wherein the at least one radar scenario comprises at least two radar targets.

3. The radar simulation apparatus according to claim 1, wherein the first number of radar signals comprises one or more of a chirp signal, a frequency hopping signal, and a Doppler signal.

4. The radar simulation apparatus according to claim 1, wherein the second number of manipulated radar signals comprises one or more of a chirp signal, a frequency hopping signal, and a Doppler signal.

5. The radar simulation apparatus according to claim 1, wherein the manipulation of the first number of radar signals comprises adjustment of one or more of signal frequency, signal delay, and signal amplitude.

6. The radar simulation apparatus according to claim 1, wherein the manipulation of the first number of radar signals is with respect to angle, and is achieved by selecting a respective number of the at least two antennas having a desired angular position for the transmission of the second number of manipulated radar signals to the device under test.

7. The radar simulation apparatus according to claim 1, further comprising:
    an optical simulator configured to generate an optical representation of the at least one radar scenario based on the second number of manipulated radar signals, wherein the optical representation of the at least one radar scenario comprises radar reference points.

8. The radar simulation apparatus according to claim 1, wherein one or more of the following are performed:
    weather conditions comprising one or more of rain, snow and wind are simulated by the radar simulation apparatus; and
    interferers comprising one or more of radar sensors of other vehicles and radar of traffic management systems are simulated by the radar simulation apparatus.

9. A radar simulation method for testing a device under test with respect to at least one radar scenario, the radar simulation method comprising:
    storing, via a memory, the at least one radar scenario with respect to the device under test, and providing the at least one radar scenario to a radar simulator, wherein the at least one radar scenario is capable of being simulated in a continuous manner until intentionally terminated;
    receiving, by the radar simulator, a first number of radar signals from the device under test, simulating the first number of radar signals based on the at least one radar scenario, and generating a resulting second number of manipulated radar signals; and
    transmitting the second number of manipulated radar signals to the device under test; and
    wherein the first number of radar signals is received by the radar simulator via one or more of at least two antennas, and the second number of manipulated radar signals is transmitted to the device under test via the at least two antennas,
    wherein the least two antennas form an antenna array that is one of a two-dimensional antenna array and a three-dimensional antenna array, and multiple first antennas of the antenna array are arranged at different angles with respect to a main radiation direction of the device under test, and
    wherein multiple second antennas outside the antenna array are arranged at the same angles as the multiple first antennas with respect to the main radiation direction of the device under test, and at different distances to the device under test than distances of the multiple first antennas to the device under test.

10. The radar simulation method according to claim 9, wherein the at least one radar scenario comprises at least two radar targets.

11. The radar simulation method according to claim 9, wherein the first number of radar signals comprises one or more of a chirp signal, a frequency hopping signal, and a Doppler signal.

12. The radar simulation method according to claim 9, wherein the second number of manipulated radar signals comprises one or more of a chirp signal, a frequency hopping signal, and a Doppler signal.

13. The radar simulation method according to claim 9, wherein the manipulation of the first number of radar signals comprises adjustment of one or more of signal frequency, signal delay, and signal amplitude.

14. The radar simulation method according to claim 9, wherein the manipulation of the first number of radar signals is with respect to angle, and is achieved by selecting a respective number of the at least two antennas having a desired angular position for the transmission of the second number of manipulated radar signals to the device under test.

15. The radar simulation method according to claim 9, further comprising:
    generating an optical representation of the at least one radar scenario based on the second number of manipulated radar signals, wherein the optical representation of the at least one radar scenario comprises radar reference points.

16. The radar simulation method according to claim 9, further comprising one or more of:
   simulating weather conditions comprising one or more of rain, snow and wind; and
   simulating interferers comprising one or more of radar sensors of other vehicles and radar of traffic management systems.

17. A system comprising:
   a device under test; and
   a radar simulation device comprising a memory, a radar simulator and at least two antennas, wherein the radar simulation device is configured for testing the device under test with respect to at least one radar scenario; and
   wherein the memory is configured to store the at least one radar scenario with respect to the device under test, and to provide the at least one radar scenario to the radar simulator, wherein the at least one radar scenario is capable of being simulated in a continuous manner until intentionally terminated,
   wherein the radar simulator is configured to receive, via one or more of the at least two antennas, a first number of radar signals from the device under test, to simulate the at least one radar scenario by manipulating the first number of radar signals based on the at least one radar scenario and generating a resulting second number of manipulated radar signals, and to transmit, via the at least two antennas, the second number of manipulated radar signals to the device under test,
   wherein the at least two antennas form an antenna array that is one of a two-dimensional antenna array and a three-dimensional antenna array, and multiple first antennas of the antenna array are arranged at different angles with respect to a main radiation direction of the device under test, and
   wherein multiple second antennas outside the antenna array are arranged at the same angles as the multiple first antennas with respect to the main radiation direction of the device under test, and at different distances to the device under test than distances of the multiple first antennas to the device under test.

18. A training system for training an autonomous vehicle with the aid of at least one traffic scenario, the training system comprising:
   a memory;
   a radar simulator;
   at least two antennas;
   an optical simulator; and
   a display; and
   wherein the memory is configured to store the at least one traffic scenario and to provide the at least one traffic scenario to the radar simulator and to the optical simulator, wherein the at least one traffic scenario is capable of being simulated in a continuous manner until intentionally terminated,
   wherein the radar simulator is configured to generate a radar representation of the at least one traffic scenario by receiving a first number of radar signals from at least one radar sensor of the autonomous vehicle via the at least two antennas and generating a second number of manipulated radar signals by simulating the at least one traffic scenario based on a manipulation of the first number of radar signals with respect to the at least one traffic scenario, and to transmit the second number of manipulated radar signals to the at least one radar sensor of the autonomous vehicle via the at least two antennas,
   wherein the optical simulator is configured to generate an optical representation of the at least one traffic scenario based on the second number of manipulated radar signals,
   wherein the display is configured to display the optical representation of the at least one traffic scenario,
   wherein the at least two antennas form an antenna array that is one of a two-dimensional antenna array and a three-dimensional antenna array, and multiple first antennas of the antenna array are arranged at different angles with respect to a main radiation direction of the device under test, and
   wherein multiple second antennas outside the antenna array are arranged at the same angles as the multiple first antennas with respect to the main radiation direction of the device under test, and at different distances to the device under test than distances of the multiple first antennas to the device under test.

19. The training system according to claim 18, further comprising:
   a feedback circuit configured to receive vehicle information from at least one electronic controller of the autonomous vehicle, and to provide the information to the radar simulator and to the optical simulator, wherein the vehicle information includes data reflecting one or more of acceleration, deceleration and steering of the autonomous vehicle; and
   wherein the radar simulator is further configured to adapt the radar representation of the at least one traffic scenario based on the received vehicle information, and
   wherein the optical simulator is further configured to adapt the optical representation of the at least one traffic scenario based on the received vehicle information.

20. The training system according to claim 18, wherein, with respect to the radar representation generated by the radar simulator, one or more of the following are performed:
   weather conditions comprising one or more of rain, snow and wind are simulated by the radar simulator; and
   interferers comprising one or more of radar sensors of other vehicles and radar of traffic management systems are simulated by the radar simulator.

21. The training system according to claim 20, wherein, with respect to the weather conditions, one or more of the rain and the snow are reflected by noise superposing the second number of manipulated radar signals transmitted to the at least one radar sensor of the autonomous vehicle, and/or the wind is reflected by fading of the second number of manipulated radar signals transmitted to the at least one radar sensor of the autonomous vehicle.

* * * * *

UNITED STATES PATENT AND TRADEMARK OFFICE
CERTIFICATE OF CORRECTION

PATENT NO. : 10,527,715 B2
APPLICATION NO. : 15/235358
DATED : January 7, 2020
INVENTOR(S) : Sherif Ahmed et al.

Page 1 of 1

It is certified that error appears in the above-identified patent and that said Letters Patent is hereby corrected as shown below:

On the Title Page

In the Title, and in the Specification at Column 1, Lines 1-2, replace "RADAR TARGET STIMULATION DEVICE AND METHOD" with -- RADAR TARGET SIMULATION DEVICE AND METHOD --.

Signed and Sealed this
Second Day of June, 2020

Andrei Iancu
*Director of the United States Patent and Trademark Office*